March 13, 1934.　　A. V. D. WILLGOOS　　1,951,045
SUPERCHARGER DRIVE FOR INTERNAL COMBUSTION ENGINES
Filed Sept. 22, 1931
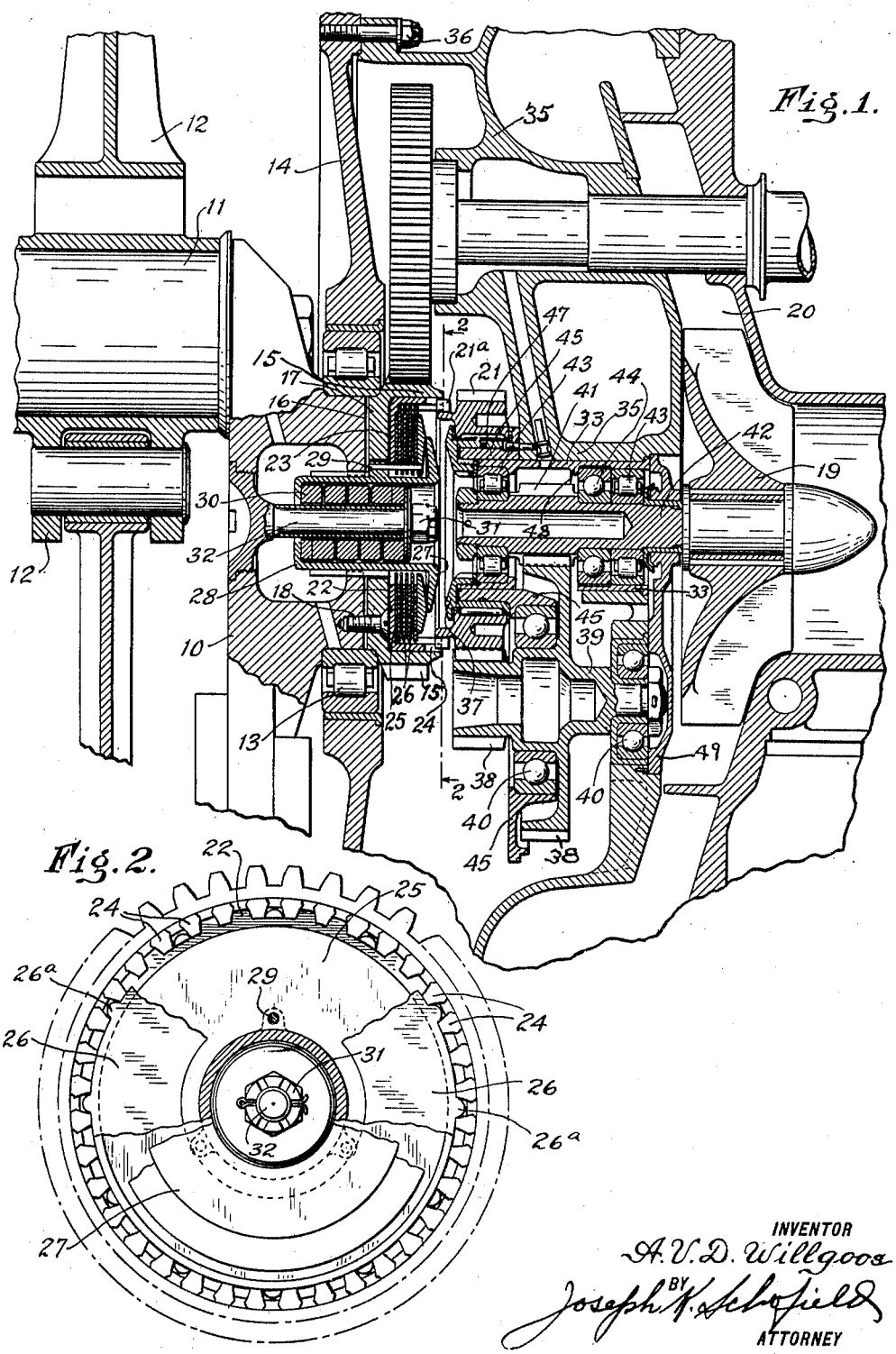
INVENTOR
A. V. D. Willgoos
BY Joseph K. Schofield
ATTORNEY Patented Mar. 13, 1934

1,951,045

UNITED STATES PATENT OFFICE 1,951,045

SUPERCHARGER DRIVE FOR INTERNAL COMBUSTION ENGINES

Andrew V. D. Willgoos, West Hartford, Conn., assignor to The Pratt & Whitney Aircraft Company, East Hartford, Conn., a corporation of Delaware Application September 22, 1931, Serial No. 564,265

8 Claims. (Cl. 230—127)

This invention relates to aircraft engines and in particular to a supporting and driving means for a supercharger of the rotary impeller type.

An important object of the invention is to provide an improved form of friction clutch and mounting therefor for driving the impeller of a supercharger directly from the engine crankshaft.

Another object of the invention is to provide an improved housing for the members forming the friction clutch, these members preferably being disposed within the central portion of the engine crank-shaft and within a driving gear fixedly secured to the crank-shaft.

A still further object of the invention is to support the impeller and its driving connections in driving relation to the frictionally rotated clutch member upon a frame member of the engine separate from the frame member supporting the crank-shaft so that any strains within the crank-shaft occasioned by the load upon the engine will not effect any misalignment or produce any undue strains in the driving members and connections for the impeller.

A still further object of the invention is to provide a flexible connection between the frictionally driven clutch member and the driving gear for the impeller permitting these members to adjust themselves axially and also angularly to a limited extent but being positively rotated together.

Another object of importance is that a reinforcing member is associated with the engine frame member within which the driving connections for the impeller are mounted. Preferably this reinforcing member is in the form of a forging provided with accurately spaced openings within which may be fitted antifriction bearings for the impeller shaft and for an intermediate driving member therefor.

And, finally, it is an object of the invention to provide a supercharger unit and driving means therefor which may be readily assembled in an engine and be housed compactly therein without the addition of any appreciable number of parts or weight.

With these and other objects in view my invention includes the features of construction and operation set forth in the following specification and illustrated in the accompanying drawing.

In the accompanying drawing annexed hereto and forming a part of this specification I have shown my invention embodied in a radial type aircraft engine, but it will be understood that the invention can be otherwise embodied and that the drawing is not to be construed as defining or limiting the scope of the invention, the claims appended to this specification being relied upon for that purpose.

This application constitutes a continuation in part of my copending application Serial No. 359,797, filed May 2, 1929.

In the drawing:

Figure 1 is a longitudinal sectional view through a portion of the crank-shaft and the supercharger of the engine; and Fig. 2 is a cross-sectional view of the friction clutch for the supercharger taken upon line 2—2 of Fig. 1.

In the above mentioned drawing I have shown but one embodiment of the invention which is now deemed preferable, but it is to be understood that changes and modifications may be made within the scope of the appended claims without departing from the spirit of the invention.

In aircraft engines it is now common or standard practice to provide a supercharger associated with the engine to increase the volume and pressure of air taken into the combustion cylinders through the intake passages. The impeller of such a supercharger may be and preferably is driven directly from the engine crankshaft through suitable driving connections, usually, and in the illustrated embodiment of the invention, of the gear type. The present invention relates generally to the mounting and driving of a gear driven supercharger in a manner which will eliminate all possibility of any undue strains upon the driving members for the supercharger impeller due to deflection of or strains upon the members of the crank-shaft and its supporting engine frame member when in operation. It is also adapted, by the introduction of a friction clutch, to eliminate the extreme stresses upon the gear connections caused by sudden changes in speed of rotation of the crank-shaft as when starting the engine. The friction clutch has its friction disks compactly housed within a gear for driving the engine accessories mounted on one end of and driven directly by the engine crank-shaft, the spring for forcing the disks of the clutch together being housed within the recessed central portion of the crank-shaft, the pressure between the friction plates or disks being regulated by a central manually adjusted bolt.

Referring more in detail to the figures of the drawing, I show a portion of a radial type aircraft engine having a crank-shaft 10, a part only of which is shown. On the crank pin 11 of the crank-shaft 10 is a connecting rod 12. This portion of the crank-shaft 10 shown in the drawing is rotatably mounted upon antifriction bearings 13 within one of the principal frame members 14 of the engine.

Mounted upon one end face of the crank-shaft portion 10 is a spur gear 15. This gear 15 may be secured to the crank-shaft 10 against rotation by a radial slot 16 in the crank-shaft 10 engaging a corresponding radial projection 17 in the adjacent face of the gear 15. The gear 15 may be further secured rigidly to the crank-shaft 10 by means of a plurality of screws 18, one only of which is shown. This gear 15 is used to drive auxiliaries associated with the engine and is recessed upon its outer side to house the friction clutch presently to be described through which the impeller 19 of a supercharger for forcing air into the intake passage 20 is driven.

In order to frictionally drive the impeller 19 of the supercharger at high speed, usually higher than the speed of the crank shaft, and in a manner so that sudden impulses or changes of speed of rotation of the crank-shaft 10 may not injure any of the parts thereof the driving gear 21 for the supercharger impeller 19 is driven through a multiple disk friction clutch. This clutch preferably, and as shown, is housed within the driving gear 15 for the auxiliaries and portions of the clutch extend into a recessed portion of the engine crank-shaft 10, thus reducing the space required for the clutch members. As will be seen in Fig. 1, the driving gear 15 has a plane surface at the bottom of its recess against which is positioned a thin plate 22 forming one of the bearing members of the disk clutch. The periphery of this plate 22 fits snugly within the recess of gear 15 but the plate 22 is free to rotate within the recess. Against this bearing member or plate 22 is an annular member 23 having inwardly extending teeth 24 cut into its annular flange portion. Lying on the opposite side of this member and bearing against it is another plate 25 forming a bearing member. Beyond this plate 25 are several bearing members or plates 26 disposed between additional plates 25. Against the outer surface of these plates is placed a pressure member 27 having a cylindrical hub portion 28 extending into the recessed hub portion of the crank-shaft portion 10. Pins 29 are driven in the member 27 between the flange portion and small projections on the the hub portion 28. These pins 29 pass through openings through the plates 25 and thus force the plates 25 to rotate with the pressure applying member 27. The plates 26 disposed between the plates 25 and the member 27 are, at their periphery, provided with rounded extensions 26ª fitting within and between the inwardly extending teeth 24 formed on the member 23.

Within the cylindrical hub portion 28 of the member 27 is housed a helical spring 30, the pressure of which may be varied by taking up a nut 31 upon a bolt 32 centrally disposed within the recess in the crank-shaft 10. One end of the helical spring 30 bears against the inner wall of the cylindrical hub portion 28 and the outer end against a plate or washer upon the bolt 32. The member 27 is thus forced by the spring 30 strongly against the bearing members 22, 23, 25 and 26, and the surface of the driving gear 15. It will thus be seen from the above that the member 23 provided with the inwardly extending teeth 24 housed within the driving gear 15 is frictionally driven therefrom, the friction being adjustable by taking up on the nut 31 to increase or decrease the pressure of the helical spring 30 acting upon this member.

The member 23 through its integrally formed teeth 24 turns the driving gear 21 of the supercharger unit more fully described hereafter. The clutch teeth 21ª of this driving gear 21 adjacent the gear 15 engages within the spaces between the teeth 24 of the member 23. This connection permits slight axial and angular movement between the member 23 and the gear 21 while the gear 21 remains in positive driving connection with said member 23.

The driving gear 21, which is of ring form, is supported upon a needle bearing 47 the inner ring member of which is mounted on a reinforcing strap member 45. This strap member 45 in turn is positioned over one end of a sleeve 33 housed within a frame member 35. The needles or rollers of the bearing 47 directly engage the inner surface of the ring gear 21. To retain the gear 21 in position upon the strap member 45 and also to retain the member 45 upon its sleeve 33 a flanged ring member 37 is threaded into one end of the sleeve 33, its flange extending outwardly sufficiently to engage a face of the gear 21.

It will be seen from the above described construction and from the connections for driving the gear 21 that any slight misalignment between frictionally driven member 23 and driving gear 21 may be taken up by the teeth of the driving gear 21 and those of the driven member 23. Sudden changes in the rotative speed of the crank-shaft 10 will cause the frictionally driven member 23 to slip, thus preventing undue stresses within the driving connections for the impeller 19 and within the impeller members themselves. Also, any slight angular strains of the crank-shaft 10 due to the stresses within the crank-shaft 10 during operation will not be imparted to the driving gear 21 as the fricitionally driven member 23 and the driving gear 21 permit slight adjustment between the intermeshing teeth both axially and angularly. Also, the driving gear 21 is supported upon a separate frame member from that supporting the crank shaft so that none of the strains of the crank-shaft 10 or gear 15 thereon will be imparted to or in any way cramp the driving connections for the supercharger impeller 19.

Meshing with the teeth of the driving gear 21 is a pinion of a compound gear member 38 rotatably mounted upon an axis parallel to the axis of the crank-shaft 10 and supported upon the frame member 35. This compound gear member 38 may preferably be rotated with its supporting stud or shaft 39 upon antifriction bearings 40. One of these bearings is interposed between shaft 39 and a portion of the frame member 35 in which it is supported. The other or left-hand bearing 40 is mounted within the larger gear of the compound gear 38 upon an enlarged hub portion thereof. This bearing 40 has its outer ring member housed within a depending loop portion of the strap member 45. Thus supported upon the two spaced antifriction bearings 40 the compound gear 38 is rigidly supported in proper relation to its intermeshing gears. The strap member 45, which may be formed of a steel forging, serves to provide a light weight but strong member supplementing the frame 35 in properly supporting the intermediate compound gear 38.

The larger gear of the compound gear unit 38 preferably is integral with the pinion and meshes with a pinion 41 formed integrally on a shaft 42 substantially coaxial with the crank-shaft 10. This shaft 42 is rotatably mounted upon antifriction bearings 43 and 44 within the sleeve 33 housed in the frame member 35. A cut-out portion in the lower portion of this sleeve 33 permits the larger member of the compound gear 38 to engage the pinion 41. Upon the outer end of this shaft 42 is rigidly mounted the supercharger impeller 19 for rotation with the shaft 42.

The antifriction bearings 43 have their outer rings pressed into the sleeve 33 from opposite ends, these end bearings being of the roller type and designed to take up the radial thrusts upon the shaft 42. The central bearing 44 is of a different type primarily designed to take up the axial thrusts upon the shaft 42. Preferably and as shown this bearing 44 is of the deep grooved ball type and has its outer ring within sleeve 33 and disposed between a small inwardly extending flange 48 within the sleeve 33 and the face of one of the bearings 43. This outer ring of the bearing 44 is free to adjust itself radially to a limited extent, the sleeve 33 adjacent this bearing being recessed sufficiently for that purpose. The bearing 44 therefore does not take any of the radial thrust upon the shaft 42 and therefore has no tendency to disturb the alignment of shaft determined by the spaced bearings 43. The bearing 44 assumes a radial position within sleeve 33 between flange 48 and one of the bearings 43 which will not cramp or unduly load either of the bearings 43.

Enclosing the outer end of the sleeve 33 and also the shaft 39 is a cover plate 49 bolted or otherwise secured in any desired manner to a face of the frame member 35. Through an opening in this cover plate 49 extends the outer end of the shaft 42 upon which the impeller 19 is mounted.

What I claim is:

1. In an internal combustion engine, a crank-shaft, a supercharger impeller, driving means for said impeller having a flexible connection with said crank-shaft, driving connections between said driving means and said impeller, a frame member supporting said crank-shaft and said driving means, a separate frame member supporting said impeller and said driving connections, and a reinforcing member supported upon said last mentioned frame member, said reinforcing member housing a bearing for an intermediate driving connection and supporting a bearing for said impeller driving means.

2. An internal combustion engine comprising in combination, a crank shaft, a supercharger impeller, a frame member supporting said crank-shaft, a separate frame member supporting said impeller, a frictionally driven member for driving said impeller supported in the frame member for said crank shaft, driving connections from said driven member to said impeller supported in said frame member for said impeller, a reinforcing member supported upon said last mentioned frame member, an antifriction bearing mounted therein for rotatably supporting an intermediate connection for said impeller.

3. An internal combustion engine comprising in combustion, a crank-shaft, a supercharger impeller, separate frame members respectively for said crank-shaft and said impeller, driving means for said impeller rotatably supported in said frame for said crank shaft, connections between said driver member and said impeller supported in said frame member for said impeller, a flexible connection between said driver and connections for said impeller, a sleeve within said last mentioned frame member having bearings therein for said impeller, and a reinforcing member mounted upon said sleeve housing a bearing for one of said driving connections.

4. An internal combustion engine comprising in combination, a crank-shaft, a supercharger impeller, separate frame members supporting said crank-shaft and impeller, a friction clutch housed within said crank-shaft, a driven member frictionally rotated thereby, means to adjust the pressure between the members of said clutch, a driving gear for said impeller coaxial with said crank shaft having teeth thereon engaging said driven member, and connections between said gear and said impeller supported on said frame member for said impeller.

5. An internal combustion engine comprising in combination, a crank-shaft, a supercharger impeller, separate frame members supporting said crank-shaft and impeller, a friction clutch having a driving member on said crank-shaft and having a driven member coaxial of the crank shaft and frictionally rotated thereby, a spring housed within said crank-shaft for holding said driven member toward its driving member, and connections between said clutch driven member and said impeller supported on the frame member for said impeller.

6. An internal combustion engine comprising in combination, a crank-shaft, a supercharger impeller, separate frame members supporting said crank-shaft and impeller, a friction clutch housed within said crank-shaft and having a driving member, a driven member coaxial of the crank shaft and provided with teeth upon its periphery, spring means for varying the friction between said driving and driven members, a driving gear for said impeller, said driving gear engaging the teeth on said driven member in a manner permitting limited axial and angular movement of said gear with said driven member while maintaining rotative driving relation, and connections between said driving gear and said impeller supported within said frame member for said impeller.

7. An internal combustion engine comprising in combination, an engine frame member, a crank-shaft therein, a second frame member, a supercharger impeller supported therein, a shaft supporting said impeller, a sleeve supported within the frame member for said impeller, bearings axially spaced within said sleeve for said shaft including a thrust bearing supported for limited lateral adjustment and spaced radial bearings, and a driving gear on said shaft disposed between said radial bearings.

8. In an internal combustion engine, a crank-shaft, a supercharger impeller, driving means for said impeller connected to said crank-shaft, driving connections between said means and said impeller, a frame member supporting said crank-shaft and said driving means, a separate frame member, a sleeve mounted therein having bearings for supporting said impeller and said driving connections, and a reinforcing member mounted on one end of said sleeve, said reinforcing member housing the bearings for said impeller shaft and a bearing for the intermediate driving member therefor.

ANDREW V. D. WILLGOOS.